(12) United States Patent
Czarnecki

(10) Patent No.: US 8,964,345 B2
(45) Date of Patent: *Feb. 24, 2015

(54) SEMIAUTOMATIC TRANSFER SWITCH WITH OPEN NEUTRAL PROTECTION

(71) Applicant: Reliance Controls Corporation, Racine, WI (US)

(72) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/915,181

(22) Filed: Jun. 11, 2013

(65) Prior Publication Data

US 2014/0001869 A1    Jan. 2, 2014

Related U.S. Application Data

(60) Provisional application No. 61/672,508, filed on Jul. 17, 2012, provisional application No. 61/667,044, filed on Jul. 2, 2012.

(51) Int. Cl.
*H02H 3/00*     (2006.01)
*H02J 3/00*     (2006.01)
*H02J 9/08*     (2006.01)

(52) U.S. Cl.
CPC .. *H02J 3/006* (2013.01); *H02J 9/08* (2013.01)
USPC .......................................................... 361/86

(58) Field of Classification Search
USPC .......................................................... 361/86
See application file for complete search history.

(56) References Cited

U.S. PATENT DOCUMENTS

| | | | |
|---|---|---|---|
| 3,269,026 A * | 8/1966 | Maas et al. | 34/528 |
| 3,809,961 A | 5/1974 | Kershaw | |
| 3,944,891 A * | 3/1976 | McDonald et al. | 361/77 |
| 3,987,341 A | 10/1976 | Clark | |
| 4,067,054 A * | 1/1978 | Clark | 361/91.5 |
| 4,574,324 A | 3/1986 | Packard | |
| 4,598,331 A | 7/1986 | Legatti | |
| 4,931,893 A | 6/1990 | Glennon et al. | |
| 5,191,318 A | 3/1993 | Glennon | |
| 7,099,130 B2 * | 8/2006 | Angle et al. | 361/44 |
| 7,136,267 B2 | 11/2006 | Silverman | |
| 7,161,780 B2 | 1/2007 | Germain et al. | |
| 7,463,124 B2 | 12/2008 | DiSalvo et al. | |
| 8,547,673 B2 * | 10/2013 | Natili et al. | 361/91.1 |
| 2007/0025875 A1 | 2/2007 | Peters et al. | |
| 2010/0046128 A1 * | 2/2010 | Wang et al. | 361/42 |
| 2012/0218684 A1 * | 8/2012 | Andersen et al. | 361/601 |

* cited by examiner

*Primary Examiner* — Dharti Patel
(74) *Attorney, Agent, or Firm* — Boyle Fredrickson, S.C.

(57) ABSTRACT

A semiautomatic switching device is configured to selectively connect one of two power sources to a load. Each of the power sources is a split-phase power source including a first hot lead, a second hot lead, and a neutral lead. When the second split-phase power source is generating power, the voltage between the first or second hot lead and the neutral lead closes a corresponding first or second contact. The first and second contacts are connected in series between the first hot lead, the second hot lead and a third switch. The voltage potential present between the first hot lead and the second hot lead closes a third and fourth contact. The third contact is connected in series between the first hot lead and the load and the fourth contact is connected in series between the second hot lead and the load. The switching device protects against open neutral conditions.

15 Claims, 3 Drawing Sheets

SEMIAUTOMATIC TRANSFER SWITCH WITH OPEN NEUTRAL PROTECTION

CROSS-REFERENCE TO RELATED APPLICATIONS

This application claims priority to U.S. provisional application Ser. No. 61/672,508, filed on Jul. 17, 2012 and titled "Semiautomatic Transfer Switch With Open Neutral Protection," and to U.S. provisional application Ser. No. 61/667,044, filed on Jul. 2, 2012 and titled "Open Neutral Protection;" the entire contents of both applications are expressly incorporated herein.

BACKGROUND OF THE INVENTION

The subject matter disclosed herein relates to a semiautomatic transfer switch and, more specifically, to a transfer switch configured to connect a secondary power source to an electrical load upon verification of proper electrical connections between the secondary power source and the transfer switch.

Typically, utility power is delivered to the customer via a split-phase electrical distribution system. The split-phase electrical distribution system includes two "hot" wires, L1 and L2, which conduct alternating current having the same magnitude but offset by 180 degrees, and a neutral conductor, N. This split-phase electrical system is configured to supply power to alternating current (AC) loads of two different magnitudes. For example, 120 VAC loads are connected between either L1 or L2 and the neutral conductor and 240 VAC loads are connected between L1 and L2.

It is known that the utility power lines are exposed to harsh environmental conditions and can become inoperable for many reasons, such as inclement weather, ice, falling, trees, animal damage, etc., which may cause a portion of the power grid to fail or blackout. Consequently, many utility power customers utilize a backup generator to power some or all of the electrical loads present at the residence or building. Because the utility power is typically delivered via a split-phase electrical distribution system, the majority of backup generators are configured to deliver power in the same manner. However, backup generators are often installed by personnel not fully trained to install the equipment, for example, maintenance personnel or homeowners, increasing the potential for incorrect wiring of the backup generator.

Although the split-phase distribution system provides flexibility for the type of load to be connected, a fundamental hazard exists if the system is wired incorrectly or if a failure of a component or connection in the neutral conduction path causes the neutral conduction path to open. If the neutral conduction path is open and loads are connected to each of the two hot leads, current no longer returns on the neutral conduction path and a voltage divider network is established between the two hot leads. As a result, the voltage present between the two hot leads (e.g., 240 VAC) is divided proportionally between the two impedances seen in each half of the split distribution system. If the impedance of the loads present on one half of the system is significantly larger than the loads present on the other half, the majority of the voltage delivered by the utility will be present across the half of the system having the higher impedance. The electrical devices connected to that half of the system, which normally expect to receive a lower voltage potential (e.g., 120 VAC) will instead be connected to a substantially higher voltage potential, creating the potential to damage the electrical devices connected on the high voltage half of the system.

SUMMARY OF THE INVENTION

The subject matter disclosed herein relates to a semiautomatic switching device configured to monitor the neutral connection between a secondary power source and a load in a split-phase distribution system. The switching device includes a first switch operatively connected between a first hot lead and a neutral lead from the secondary power source, and a second switch operatively connected between a second hot lead and the neutral lead from the secondary power source. When the secondary power source is generating power, the voltage between the first hot lead and the neutral lead energizes the first switch and the voltage between the second hot lead and the neutral lead energizes the second switch. A first contact controlled by the first switch and a second contact controlled by the second switch are each connected in series between the first hot lead, the second hot lead and a third switch. The first and second contacts are closed when the first and second switches, respectively, are energized. A third voltage potential, present between the first hot lead and the second hot lead from the secondary power source, energizes the third switch. Two contacts are controlled by the third switch and are closed when the third switch is energized. One of the contacts is connected in series between the first hot lead and the load, and the other of the contacts is connected in series between the second hot lead and the load. If the neutral lead is broken or otherwise opens while the split-phase power source is operating, each of the first and second switches are de-energized, opening the connection between the power source and the load. Further, if the split-phase power source is connected to the switching device incorrectly, the voltage potentials will be incorrect such that the third switch will not energize, preventing the incorrectly wired power source form being connected to the electrical load.

According to one embodiment of the invention, a transfer switch for selectively connecting either a first power source or a second power source to an electrical load is disclosed. The transfer switch includes a first switch selectively enabled as a function of a first voltage potential, a second switch selectively enabled as a function of a second voltage potential, and a third switch selectively enabled as a function of a third voltage potential. The second voltage potential is substantially equal to the first voltage potential, and the third voltage potential is substantially twice the first voltage potential. The first switch and the second switch are connected in series to selectively connect the third voltage potential to the third switch when both the first switch and the second switch are enabled. Each of the first power source and the second power source are split-phase power sources including a first hot lead, a second hot lead, and a neutral lead.

According to another aspect of the invention, the transfer switch also includes a first voltage supply operatively connected between the first hot lead and the neutral lead of the second power source and a second voltage supply operatively connected between the second hot lead and the neutral lead of the second power source. The first voltage supply is configured to enable the first switch when the first voltage potential is present between the first hot lead and the neutral lead of the second power source and to disable the first switch when the first voltage potential is not present between the first hot lead and the neutral lead of the second power source. The second voltage supply is configured to enable the second switch when the second voltage potential is present between the second hot lead and the neutral lead of the second power source and to disable the second switch when the second voltage potential is not present between the second hot lead and the neutral lead of the second power source. Each of the first and second voltage supplies may be a rectifier circuit.

According to yet another aspect of the invention, the first switch is a first relay, the second switch is a second relay, the third switch is a third relay, and each of the first and second power sources are split-phase power sources. The first relay includes a first coil and a first contact, where the first coil is energized by a first voltage potential present between the first hot lead and the neutral lead of the second power source. The second relay includes a second coil and a second contact, where the second coil is energized by a second voltage potential present between the second hot lead and the neutral lead of the second power source. The third relay includes a third coil, a third contact, and a fourth contact, where the first contact and the second contact are connected in series with the third coil between the first hot lead and the second hot lead of the second power source. The third contact is connected in series between the first hot lead of the second power source and an electrical load, and the fourth contact is connected in series between the second hot lead of the second power source and the electrical load.

According to still another aspect of the invention, the transfer switch includes a first voltage supply and a second voltage supply. The first voltage supply is operatively connected between the first hot lead and the neutral lead of the second power source, configured to energize the first coil when the first voltage potential is present between the first hot lead and the neutral lead of the second power source, and to de-energize the first coil when the first voltage potential is not present between the first hot lead and the neutral lead of the second power source. The second voltage supply is operatively connected between the second hot lead and the neutral lead of the second power source, configured to energize the second coil when the second voltage potential is present between the second hot lead and the neutral lead of the second power source, and to de-energize the second coil when the second voltage potential is not present between the second hot lead and the neutral lead of the second power source.

According to another embodiment of the invention, a transfer switch selectively connects either a first power source or a second power source to an electrical load. Each of the first and second power sources are split-phase power distribution systems having a first hot lead, a second hot lead, and a neutral lead, and the transfer switch is configured to protect against an open neutral connection between one of the power sources and the electrical load. The transfer switch includes a first relay having a first coil and a first contact, a second relay having a second coil and a second contact, and a third relay having a third coil, a third contact, and a fourth contact. The first coil is energized by a first voltage potential present between the first hot lead and the neutral lead of the second power source. The second coil is energized by a second voltage potential present between a second hot lead and the neutral lead of the second power source. The first contact and the second contact are connected in series with the third coil between the first hot lead and the second hot lead of the second power source. The third contact is connected in series between the first hot lead of the second power source and an electrical load, and the fourth contact is connected in series between the second hot lead of the second power source and the electrical load. A third voltage potential exists between the first hot lead and the second hot lead of the second power source, and the third voltage potential is greater than both the first voltage potential and the second voltage potential. The third coil may be energized by the third voltage potential.

According to still another embodiment of the invention, a method of transferring an electrical connection to an electrical load from a first power source to a second power source is disclosed. Each of the first power source and the second power source are split-phase power systems including a first hot lead, a second hot lead, and a neutral lead. A first voltage potential exists between the first hot lead and the neutral lead. A second voltage potential exists between the second hot lead and the neutral lead. A third voltage potential exists between the first hot lead and the second hot lead. A first switch is closed when the first voltage potential is present between the first hot lead and the neutral lead of the second power source, and the first switch is operatively connected between the first hot lead and the neutral lead. A second switch is closed when the second voltage potential is present between the second hot lead and the neutral lead of the second power source, and the second switch is operatively connected between the second hot lead and the neutral lead. A third switch having a first terminal and a second terminal is closed. Closing the first and second switches establishes an electrical connection between either the first terminal or the second terminal of the third switch and either the first hot lead or the second hot lead of the second power source. The other terminal of the first and second terminals of the third switch is electrically connected to the other lead of the first and second hot leads of the second power source.

These and other objects, advantages, and features of the invention will become apparent to those skilled in the art from the detailed description and the accompanying drawings. It should be understood, however, that the detailed description and accompanying drawings, while indicating representative embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
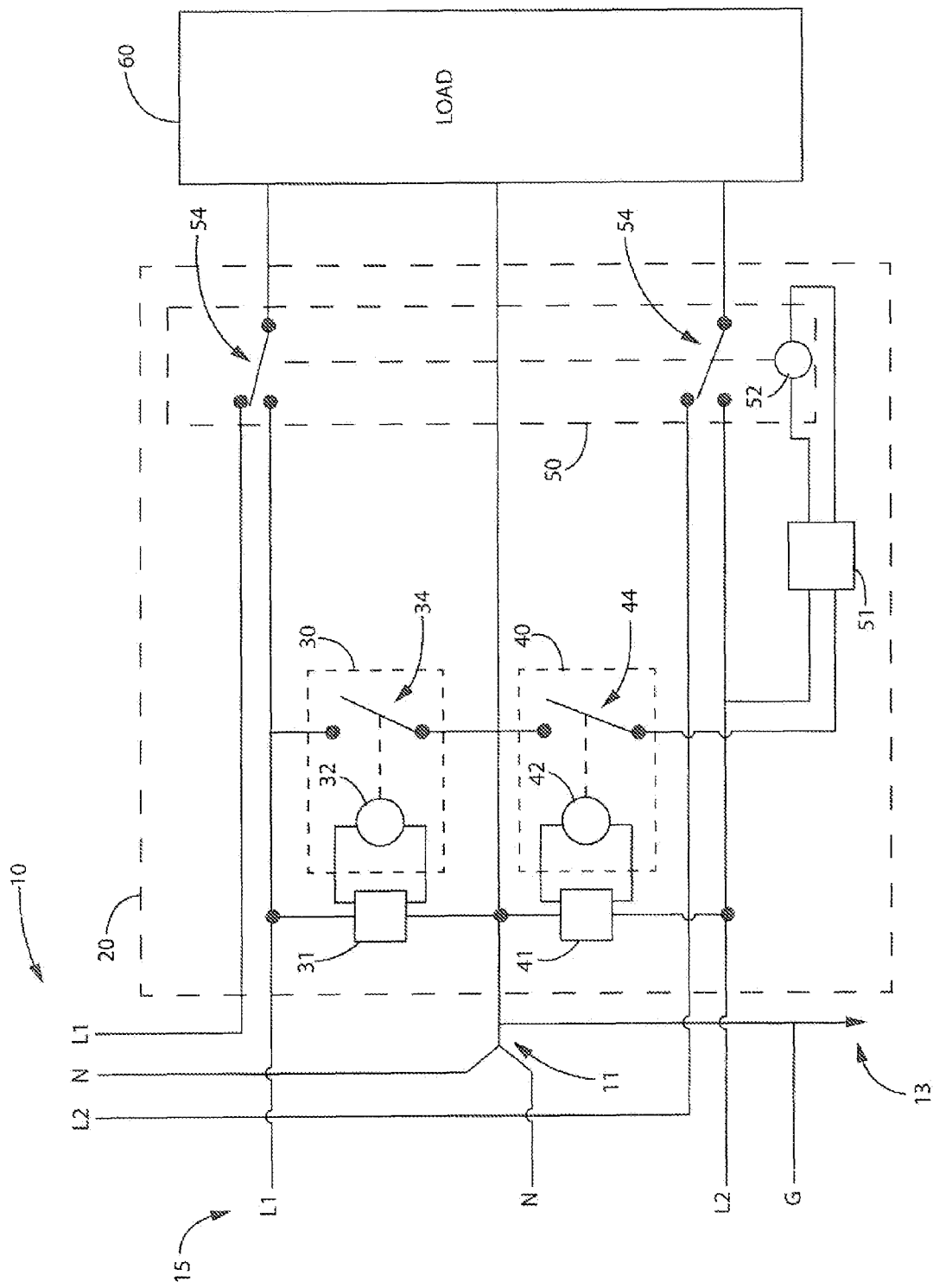
FIG. 1 is a schematic diagram of one embodiment of a transfer switch for selectively connecting one of two power sources to an electrical load in accordance with the present invention.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto may be used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, a transfer switch 20 is configured to receive power from a first power source 10 and a second power source 15. According to one embodiment of the invention, the first power source 10 may be a utility grid and the second power source 15 may be a backup generator. Each power source 10, 15 is configured as a split-phase electrical distribution system and includes a first hot lead L1, a second hot lead L2, and a neutral lead N. The neutral leads N from each power source 10,15 are electrically connected at a common connection 11 which is, in turn, electrically connected to a ground connection 13. The transfer switch 20 selectively connects the hot leads L1, L2 of one of the two power sources 10, 15 to an electrical load 60. The electrical load 60 may be a single device or multiple devices and each device may be connected between the first hot lead L1 and neutral N, the second hot lead L2 and neutral N, or the first hot lead L1 and the second hot lead L2.

The transfer switch 20 is configured to verify that the second power source 15 is correctly wired to the transfer switch 20 prior to connecting the second power source 15 to the load 60. The transfer switch 20 includes a combination of three switches that are used to verify the electrical connections between the second power source 15 and the transfer switch 20. A first switch 30 is selectively enabled as a function of the voltage potential between the first hot lead L1 and the neutral lead N from the second power source 15. A second switch 40 is selectively enabled as a function of the voltage potential between the second hot lead L2 and the neutral lead N from the second power source 15. A third switch 50 is configured to selectively connect the first hot lead L1 and the second hot lead L2 from the second power source 15 to the electrical load 60 when both the first switch 30 and the second switch 40 are enabled.

According to the illustrated embodiment, the first switch 30 is a relay having a first coil 32 and a first contact 34. The first coil 32 is operatively connected between the first hot lead L1 and the neutral lead N from the second power source 15. The second switch 40 is a relay having a second coil 42 and a second contact 44. The second coil 42 is operatively connected between the second hot lead L2 and the neutral lead N from the second power source 15. The third switch 50 is a relay having a third coil 52, a third contact 54, and a fourth contact 56. The third coil 52 is operatively connected in series with the first contact 34 and the second contact 44 between the first hot lead L1 and the second hot lead L2 from the second power source 15. The third contact 54 is connected in series with the first hot lead L1 between the second power source 15 and the load 60, and the fourth contact 56 is connected in series with the second hot lead L2 between the second power source 15 and the load 60.

According to one embodiment of the invention, each of the coils 32, 42, 52 are energized by a DC voltage. Relays 30, 40, 50 may include respective integral power supplies 31, 41, 51 which convert the voltage potential between a corresponding pair of the leads to a desired DC voltage required to energize the respective coils 32, 42, 52. In order for the integral power supplies 31, 41, 51 to operate, the supply and return paths to each of the power supplies 31, 41, 51 must be properly connected. For the first power supply 31, the first hot lead L1 and the neutral lead N from the second power source 15 must each be properly connected. For the second power supply 41, the second hot lead L2 and the neutral lead N from the second power source 15 must each be properly connected. For the third power supply 51, the first and second hot leads L1, L2 from the second power source 15 must each be properly connected. If the conduction path is not properly connected, the associated integral power supply 31, 41, 51 does not generate the necessary DC voltage and the associated relay 30, 40, 50 cannot energize the associated coil 32, 42, or 52. Thus, for the first and second power supplies 31, 41 to operate, the neutral conduction path must be properly connected. Each power supply 31, 41, 51 may be a separate logic circuit connected between at least one of the hot leads L1, L2 and/or the neutral lead N and configured to supply the required DC voltage to the corresponding relay 30, 40, 50. According to one embodiment of the invention, each logic circuit is a rectifier circuit convening an incoming AC voltage to the desired DC voltage.

According to another embodiment of the invention, a first portion of the coils 32, 42, 52 may be energized by the DC voltage and a second portion of the coils 32, 42, 52 may be energized by the AC voltage. For example, the first and second coils 32, 42 may be energized by DC voltage while the third coil 52 may be energized by AC voltage. The integral power supply 31, 41 may be provided to energize the first coil 32 and the second coil 42 with a DC voltage while the third coil 52 is energized by direct connection between the first and second hot leads L1, L2 from the second power source 15.

In operation, the transfer switch 20 is configured to connect the second power source 15 to the electrical load 60 when the correct voltage potentials are being supplied by the second power source 15. The correct voltage potentials are supplied when the second power source 15 is operational and when the electrical connections between the second power source 15 and the transfer switch 20 have been properly connected.

Figure 2:
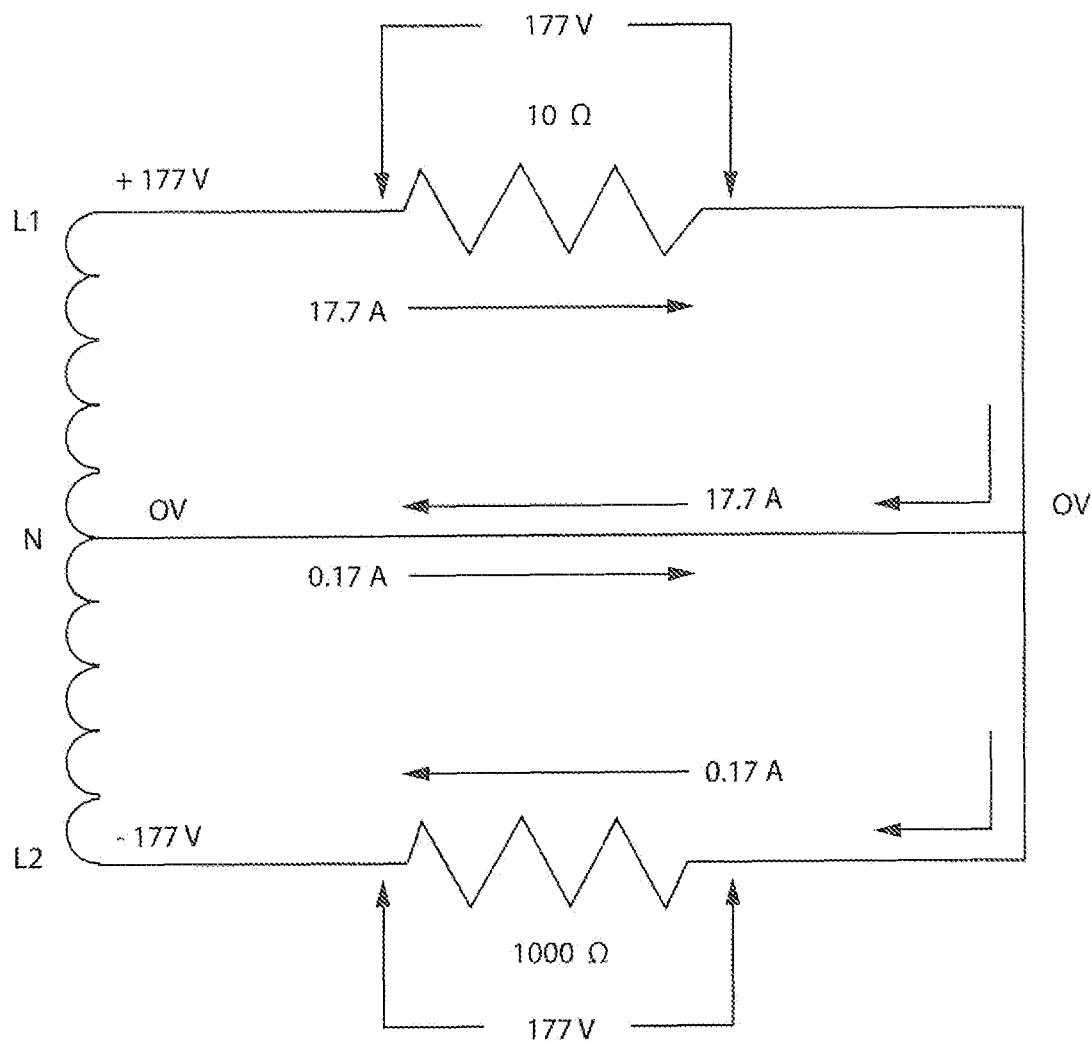
FIG. 2 is a schematic illustration of the voltage potential and currents present in one embodiment of the transfer switch in accordance with the present invention when the neutral connection is present.
Figure 3:
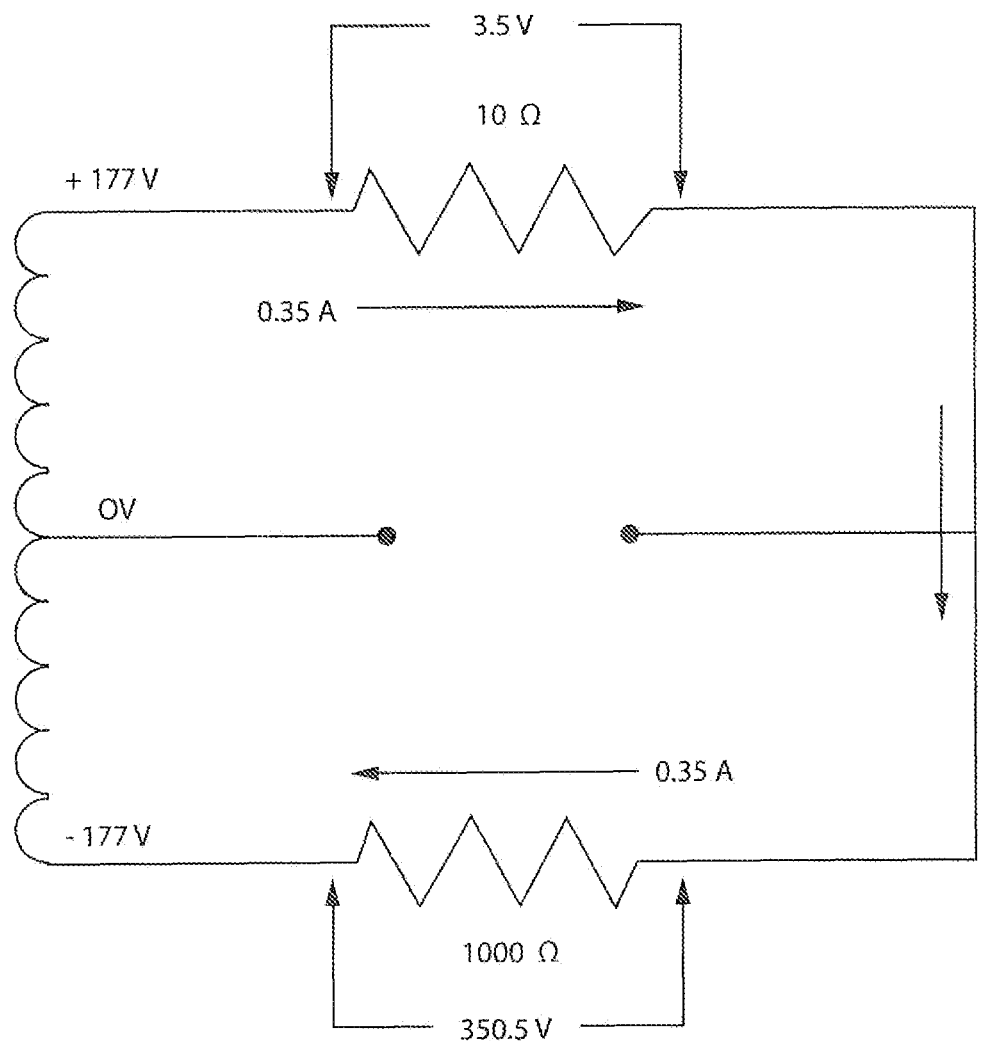
FIG. 3 is a schematic illustration of the voltage potential and currents present in one embodiment of the transfer switch in accordance with the present invention when the neutral connection is not present.

Referring to FIGS. 2 and 3, the voltage and current levels present on exemplary loads during normal operation and during open neutral operation in a split-phase distribution system are illustrated. In both figures, an exemplary load having a resistance of 10 ohms is shown connected across the first hot lead L1 and the neutral lead N and an exemplary load having a resistance of 1000 ohms is shown connected across the second hot lead L2 and the neutral lead N. Each load may be a single load or multiple loads represented by an equivalent resistance value. One of the power sources 10, 15 supplies 125 VAC between each of the hot leads L1, L2 and the neutral lead N and supplies 250 VAC between the two hot leads L1, L2. For ease of illustration, the peak value, 177 V, is illustrated with a negative sign at the second hot lead L2 representing the 180 degree phase shift between the AC voltage present at the first hot lead L1 and the AC voltage present at the second hot lead L2. In FIG. 2, the neutral connection is properly connected. The voltage potential seen across each of the exemplary loads is, therefore, 177 V, and the neutral connection provides a return path for the current flowing through each load. In FIG. 3, either a failure has occurred in the neutral connection or the neutral connection was not properly connected. As a result, the two loads define a voltage divider circuit in which the voltage potential present across each load is proportional to the resistance value of each load. The peak voltage potential seen across the two hot leads L1, L2 is 354 V or twice the peak value (i.e., 177 V) on each phase. Because the resistance value of the second load is substantially higher than the resistance value of the first load, the majority of the voltage potential seen across the two hot leads L1, L2 is present across the second load. The presence of a voltage potential almost twice what is expected may cause damage or failure of the electrical devices that constitute the exemplary load. The magnitudes of the voltages are exemplary and it is contemplated that the power sources 10, 15 may supply various other magnitudes of voltage.

When the neutral connection is properly established and the second power source 15 is generating the correct voltage, the transfer switch 20 connects the second power source 15 to the load 60. When the 125 VAC is present between each hot lead L1, L2 and the neutral lead N from the second power source 15, the first and the second power supplies 31, 41 energize the first and the second coils 32, 42, respectively. Because 125 VAC is present between each hot lead L1, L2 and the neutral lead N, both coils 32, 42 are energized and the respective normally open contacts 34, 44 are closed. The third coil 52 may be configured to be energized either by 250 VAC or by the third power supply 51 converting the 250 VAC to another AC or DC voltage suitable for energizing the third coil 52. With both the first contact 34 and the second contact 44 closed, the voltage potential between the two hot leads L1, L2 from the second power source 15 is present either at the input of the third power supply 51 or across the third coil 52. The third coil 52 is energized, closing the normally open third contact 54 and the normally open fourth contact 56. With the third contact 54 and fourth contact 56 closed, the second power source 15 is electrically connected to the load 60. Thus, when the neutral connection is properly established and the second power source 15 is generating the correct voltage, each of the contacts 34, 44, 54, 56 closes, connecting the second power source 15 to the load 60.

The transfer switch 20, therefore, functions as a semi-automatic transfer switch 20. During normal operation, the first power source 10, or the utility grid, is connected to the electrical load 60. If a power failure occurs on the first power source 10, the user starts a backup generator as the second power source 15. After the backup generator has been started and is generating the correct voltage, the coils 32, 42, and 52 are each energized, closing their respective contacts 34, 44, 54, 56, and connecting the second power source 15 to the electrical load 60. Once the first power source 10 has recovered from the initial failure, the user may turn off the backup generator. After the backup generator has been turned off, the coils 32, 42, and 52 are each de-energized, opening their respective contacts 34, 44, 54, 56, and disconnecting the second power source 15 from the electrical load 60.

The transfer switch 20 also protects electronic devices which constitute the electrical load 60 by not connecting the second power source 15 if the neutral connection is not properly connected. When the neutral connection is not properly connected, the transfer switch 20 disconnects the second power source 15 from the load 60. In order for each of the integral power supplies 31, 41, 51 to operate, their respective supply and return paths must be properly connected. If for example, the integral power supply includes a rectifier circuit, no current can flow through the input side if either the supply or return path is not connected. For each of the first and second power supplies 31, 41, the neutral lead N from the second power source 15 provides the return path. Thus, if the neutral connection is not properly made, each of the first and second power supplies 31, 41 will stop supplying voltage to the first or second coil 32, 42 and the first or second contact 34, 44 will open. If either the first contact 34 or the second contact 44 opens, the electrical connection to the third coil 52 is broken and the third coil 52 is de-energized. As a result, each of the third and fourth contacts 54, 56 open and the electrical connection between the second power source 15 and the load 60 is opened. Thus, when the neutral connection fails or is not properly established, the transfer switch 20 disconnects the second power source 15 from the load 60.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention, and will enable others skilled in the art to utilize the invention.

Various alternatives and embodiments are contemplated as being within the scope of the following claims, which particularly point out and distinctly claim the subject matter regarded as the invention.

I claim:

1. A transfer switch for selectively connecting one of a first power source and a second power source to an electrical load, the transfer switch comprising:
   a first switch selectively enabled as a function of a first voltage potential;
   a second switch selectively enabled as a function of a second voltage potential, wherein the second voltage potential is substantially equal to the first voltage potential; and
   a third switch selectively enabled as a function of a third voltage potential wherein the third voltage potential is substantially twice the first voltage potential and wherein the first switch and the second switch are connected in series to selectively connect the third voltage potential to the third switch when both the first switch and the second switch are enabled.

2. The transfer switch of claim 1, wherein each of the first power source and the second power source are split-phase power sources including a first hot lead, a second hot lead, and a neutral lead, the transfer switch further comprising:
   a first voltage supply operatively connected between the first hot lead and the neutral lead of the second power source, wherein the first voltage supply is configured to enable the first switch when the first voltage potential is present between the first hot lead and the neutral lead of the second power source and to disable the first switch when the first voltage potential is not present between the first hot lead and the neutral lead of the second power source; and
   a second voltage supply operatively connected between the second hot lead and the neutral lead of the second power source, wherein the second voltage supply is configured to enable the second switch when the second voltage potential is present between the second hot lead and the neutral lead of the second power source and to disable the second switch when the second voltage potential is not present between the second hot lead and the neutral lead of the second power source.

3. The transfer switch of claim 2 wherein the first voltage supply is a first rectifier circuit and the second voltage supply is a second rectifier circuit.

4. The transfer switch of claim 1 wherein the first switch is a first relay, the second switch is a second relay, and the third switch is a third relay.

5. The transfer switch of claim 4 wherein;
each of the first power source and the second power source are split-phase power sources including a first hot lead, a second hot lead, and a neutral lead;
the first relay includes a first coil and a first contact, wherein the first coil is energized by the first voltage potential present between the first hot lead and the neutral lead of the second power source;
the second relay includes a second coil and a second contact, wherein the second coil is energized by the second voltage potential present between the second hot lead and the neutral lead of the second power source; and
the third relay includes a third coil, a third contact, and a fourth contact, wherein the first contact and the second contact are connected in series with the third coil between the first hot lead and the second hot lead of the second power source and wherein the third contact is connected in series between the first hot lead of the second power source and the electrical load and the fourth contact is connected in series between the second hot lead of the second power source and the electrical load.

6. The transfer switch of claim 5 further comprising:
a first voltage supply operatively connected between the first hot lead and the neutral lead of the second power source, wherein the first voltage supply is configured to energize the first coil when the first voltage potential is present between the first hot lead and the neutral lead of the second power source and to de-energize the first coil when the first voltage potential is not present between the first hot lead and the neutral lead of the second power source; and
a second voltage supply operatively connected between the second hot lead and the neutral lead of the second power source, wherein the second voltage supply is configured to energize the second coil when the second voltage potential is present between the second hot lead and the neutral lead of the second power source and to de-energize the second coil when the second voltage potential is not present between the second hot lead and the neutral lead of the second power source.

7. A transfer switch selectively connecting one of a first power source and a second power source to an electrical load, wherein each of the first and the second power sources are split-phase power distribution systems having a first hot lead, a second hot lead, and a neutral lead and the transfer switch is configured to protect against an open neutral connection between one of the first and the second power sources and the electrical load, the transfer switch comprising:
a first relay having a first coil and a first contact, wherein the first coil is energized by a first voltage potential present between the first hot lead and the neutral lead of the second power source;
a second relay having a second coil and a second contact, wherein the second coil is energized by a second voltage potential present between the second hot lead and the neutral lead of the second power source; and
a third relay having a third coil, a third contact, and a fourth contact, wherein the first contact and the second contact are connected in series with the third coil between the first hot lead and the second hot lead of the second power source and wherein the third contact is connected in series between the first hot lead of the second power source and the electrical load and the fourth contact is connected in series between the second hot lead of the second power source and the electrical load.

8. The transfer switch of claim 7 wherein a third voltage potential exists between the first hot lead and the second hot lead of the second power source and wherein the third voltage potential is greater than both the first voltage potential and the second voltage potential.

9. The transfer switch of claim 8 wherein the third coil is energized by the third voltage potential.

10. The transfer switch of claim 7 further comprising:
a first voltage supply operatively connected between the first hot lead and the neutral lead of the second power source, wherein the first voltage supply is configured to energize the first coil when the first voltage potential is present and to de-energize the first coil when the first voltage potential is not present; and
a second voltage supply operatively connected between the second hot lead and the neutral lead of the second power source, wherein the second voltage supply is configured to energize the second coil when the second voltage potential is present and to de-energize the second coil when the second voltage potential is not present.

11. The transfer switch of claim 10 wherein the first voltage supply is a first rectifier circuit and the second voltage supply is a second rectifier circuit.

12. A method of transferring an electrical connection to an electrical load from a first power source to a second power source, wherein each of the first power source and the second power source are split-phase power systems including a first hot lead, a second hot lead, and a neutral lead, with a first voltage potential existing between the first hot lead and the neutral lead, a second voltage potential existing between the second hot lead and the neutral lead, and a third voltage potential existing between the first hot lead and the second hot lead, the method comprising the steps of:
closing a first switch when the first voltage potential is present between the first hot lead and the neutral lead of the second power source, wherein the first switch is operatively connected between the first hot lead and the neutral lead of the second power source;
closing a second switch when the second voltage potential is present between the second hot lead and the neutral lead of the second power source, wherein the second switch is operatively connected between the second hot lead and the neutral lead of the second power source; and
closing a third switch having a first terminal and a second terminal, wherein closing the first switch and the second switch establishes an electrical connection between one of the first terminal and the second terminal of the third switch and one of the first hot lead and the second hot lead of the second power source and wherein the other terminal of the first terminal and the second terminal of the third switch is electrically connected to the other lead of the first hot lead and the second hot lead of the second power source.

13. The method of claim 12 wherein the first switch is a first relay having a first coil and a first contact, the second switch is a second relay having a second coil and a second contact, and the third switch is a third relay having a third coil, a third contact and a fourth contact.

14. The method of claim 13 wherein the second power source is an alternating current (AC) power system, the method further comprising the steps of:
converting the first voltage potential to a first DC voltage with a first voltage supply operatively connected between the first hot lead and the neutral lead of the second power source, wherein the step of closing the first switch includes the step of energizing the first coil with the first DC voltage; and converting the second voltage potential to a second DC voltage with a second voltage supply operatively connected between the second hot lead and the neutral lead of the second power source, wherein the step of closing the second switch includes the step of energizing the second coil with the second DC voltage.

15. The method of claim 14 wherein the first voltage supply is a first rectifier circuit and the second voltage supply is a second rectifier circuit.

* * * * *